US006344072B1

(12) United States Patent
Gustafsson

(10) Patent No.: US 6,344,072 B1
(45) Date of Patent: Feb. 5, 2002

(54) MOISTURE-ABSORBING DEVICE

(76) Inventor: Bo Gustafsson, Jägmästarvägen 16, 302 73 Halmstad (SE)

( * ) Notice: Subject to any disclaimer, the term of this patent is extended or adjusted under 35 U.S.C. 154(b) by 0 days.

(21) Appl. No.: 09/718,354

(22) Filed: Nov. 24, 2000

Related U.S. Application Data

(63) Continuation of application No. PCT/SE99/00659, filed on Apr. 23, 1999.

(30) Foreign Application Priority Data

May 27, 1998 (SE) ............................................. 9801866

(51) Int. Cl.[7] .......................... B01D 53/26; B65D 81/26
(52) U.S. Cl. .............................. 96/119; 96/147; 55/494
(58) Field of Search ........................... 96/108, 119, 147, 96/148, 151, 135, 396; 55/378, 428, 429, 494, 515; 206/204

(56) References Cited

U.S. PATENT DOCUMENTS 1,914,941 A * 6/1933 Downs
2,036,909 A * 4/1936 Baker
2,341,893 A * 2/1944 Baker
2,548,335 A * 4/1951 Balogh
2,614,883 A * 10/1952 Anderson, Jr. et al.
4,615,923 A 10/1986 Marx
5,148,613 A * 9/1992 Cullen
5,215,561 A * 6/1993 Cameron
5,676,739 A * 10/1997 Gustafsson .................. 96/119
5,718,743 A * 2/1998 Donnelly et al. ............. 96/135
6,273,942 B1 * 8/2001 Jersby ......................... 96/118

FOREIGN PATENT DOCUMENTS

| | | |
|---|---|---|
| DE | 297 01 931 | 5/1997 |
| WO | WO 97/43193 | 11/1997 |

* cited by examiner

*Primary Examiner*—David A. Simmons
*Assistant Examiner*—Frank M. Lawrence
(74) *Attorney, Agent, or Firm*—Burns, Doane, Swecker & Mathis, L.L.P.

(57) ABSTRACT

A moisture-absorbing device comprises a plastic tube (1), which is made of flexible plastic sheet and which in its longitudinal direction is divided into an upper chamber containing a moisture-absorbing agent (16) and a liquid-collecting lower chamber communicating with the upper chamber. The plastic tube (1) has an opening on a level with the upper chamber. A netting element (7), which has a netting portion (8), is attached to the plastic tube (1) in such a manner that the netting portion (8) is positioned in front of the opening. The plastic tube (1) is closed at its lower end, thereby enabling collection of liquid in the lower chamber. The moisture-absorbing agent (16) is included in a filtering tube (15), which is made of an air- as well as liquid-permeable filtering material and which is arranged in the upper chamber substantially in front of the opening.

4 Claims, 2 Drawing Sheets

MOISTURE-ABSORBING DEVICE

This is a Continuation of International Application No. PCT/SE99/00659, filed Apr. 23, 1999 and claims priority for Swedish Application No. 9801866-6, filed May 27, 1998.

TECHNICAL FIELD

The present invention relates to a moisture-absorbing device being in the form of a tube, which in its longitudinal direction is divided into an upper chamber containing a moisture-absorbing agent and a lower chamber containing a liquid-collecting means and communicating with the upper chamber via a liquid-permeable means.

BACKGROUND OF THE INVENTION

WO 93/14996 discloses a first prior-art moisture-absorbing device of this kind, which is adapted to absorb moisture in a container whose walls have wall-stiffening folds forming vertical grooves on the inside of the walls, and which, to this end, is arranged in such a groove. In this prior-art device, the tube is made of a fine-meshed steel wire netting. The upper chamber contains a moisture-absorbing agent in the form of flakes of calcium chloride, and the lower chamber contains a liquid-collecting means in the form of liquid-absorbing particles of an agent that is marketed under the trade-name Skamol. In this device, the liquid-permeable means between the upper and the lower chamber consists of a partition in the form of a steel wire netting. The calcium-chloride flakes and the Skamol particles are larger than the meshes in the steel wire netting forming the tube and they are therefore retained in the tube, while air may enter. These flakes and particles are also larger than the meshes of the steel wire netting forming the partition and they are therefore retained in the respective chambers, while liquid may pass through the partition.

The above prior-art device suffers from certain drawbacks. If the device is handled carelessly, for instance during transport, the steel wire netting forming the tube can easily be damaged, thus allowing flakes and particles to escape from the tube. When the liquid-absorbing agent is saturated with liquid, liquid can escape from the device and cause damage to the goods kept in the container.

WO 95/26914 discloses a second prior-art moisture-absorbing device, which is of the kind stated by way of introduction and, in the same way as the above-mentioned first prior-art device, is adapted to be arranged in a vertical groove in a container, the tube being made of corrugated fiberboard coated with plastic and having at least one opening on a level with the upper chamber. A netting element, which has at least one fine-meshed netting portion, is attached to the inside of the tube, in such a manner that the netting portion is positioned in front of said opening. The liquid-permeable means between the upper and the lower chamber comprises a non-return valve means, which is liquid permeable only in the direction away from the upper chamber to the lower chamber. The liquid-collecting means consists of a plastic bag, which is connected to the liquid-permeable means.

In the second prior-art device, the above drawbacks of the first known device have been obviated. However, the second prior-art device is somewhat complicated to manufacture as a plurality of gluing operations are needed and several operational steps are required for mounting the plastic bag.

In a third prior-art moisture-absorbing device, which is disclosed in WO 97/43193 and which is of the kind mentioned by way of introduction, the tube is an extruded plastic tube, which in its longitudinal direction is divided into an upper chamber containing a moisture-absorbing agent, and a liquid-collecting lower chamber communicating with the upper chamber via a grating element. The tube has an opening on a level with the upper chamber. A netting element, which has a fine-meshed netting portion, is attached to the tube, so that the netting portion is positioned in front of the opening.

The tube is closed at its lower end to permit the collection of liquid in the lower chamber.

In the third prior-art device, the above drawbacks of the first and second prior-art devices are eliminated. However, the third prior-art device has, as well as the other two prior-art devices, the important inconvenience of being relatively bulky and thus taking up a great deal of space during storage and transport.

SUMMARY OF THE INVENTION

An object of the present invention is to provide a moisture-absorbing device, in which also the last-mentioned drawback has been eliminated and which moreover is very simple and cheap to manufacture.

According to the present invention, this object is achieved by means of a moisture-absorbing device in the form of a tube, which in its longitudinal direction is divided into an upper chamber containing a moisture-absorbing agent and a lower chamber containing a liquid-collecting means and communicating with the upper chamber via a liquid-permeable means, the tube having at least one opening on a level with the upper chamber, and a netting element, which has at least one netting portion, being attached to the tube, in such a manner that the netting portion is positioned in front of said opening, said device being characterized in that the tube consists of a plastic tube which is closed at its lower end and made of flexible plastic sheet, the upper portion of the plastic tube forming the upper chamber and its lower portion forming the lower chamber as well as the liquid-collecting means.

In a preferred embodiment, the moisture-absorbing agent is included in a filtering tube, which is made of an air- as well as liquid-permeable filtering material and which is arranged in the upper chamber substantially in front of said opening. The filtering tube is preferably closed at its lower end, the filtering material at this end forming the liquid-permeable means. Suitably, the filtering tube has a smaller cross-sectional area than the plastic tube has in its upper portion.

BRIEF DESCRIPTION OF THE DRAWINGS

The invention will now be described in more detail with reference to the accompanying drawings.

DETAILED DESCRIPTION OF THE INVENTION

Figure 1:
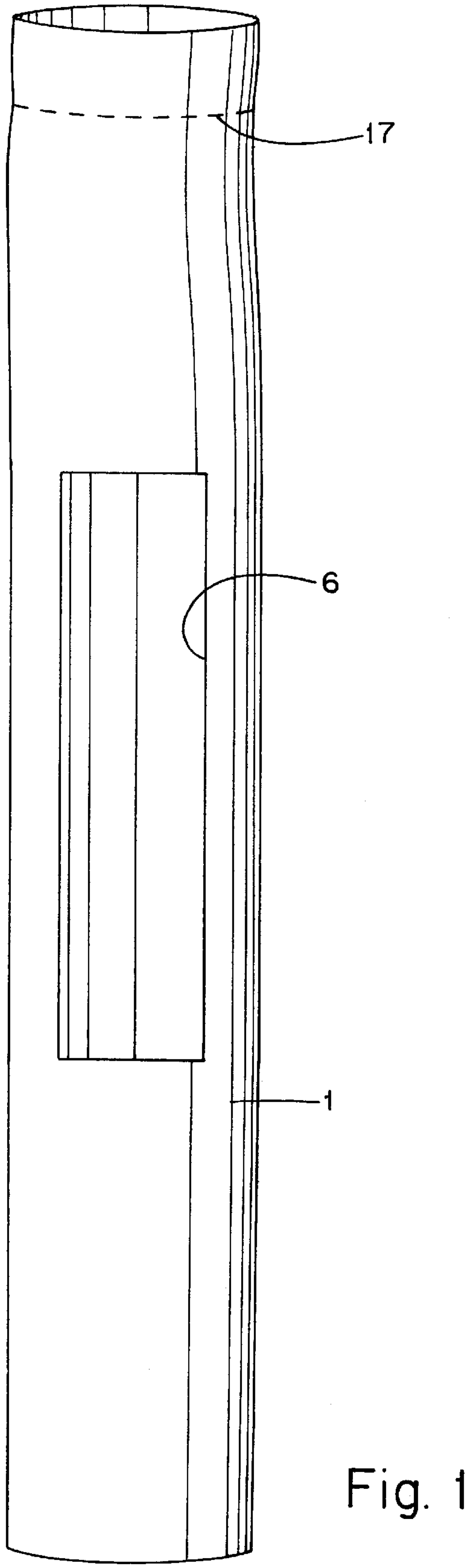
FIG. 1 is a front view showing a plastic tube for the manufacture of a device according to the invention.

FIG. 1 illustrates a plastic tube 1 which is closed at its lower end and made of flexible plastic sheet, e.g. of ethylene plastic, and of which a moisture-absorbing device 2 (FIG. 3) according to the invention is to be manufactured.

The moisture-absorbing device 2 according to the invention is advantageously used in a container 3 (FIG. 3), which has vertical pockets or grooves 4 which are formed on the inside of the container walls by the wall-stiffening folds of the container 3. The device 2 is suitably suspended in such a groove 4 by means of a hook 5.

A rectangular opening 6 is formed in the upper part of the front wall of the plastic tube 1.

Figure 2:
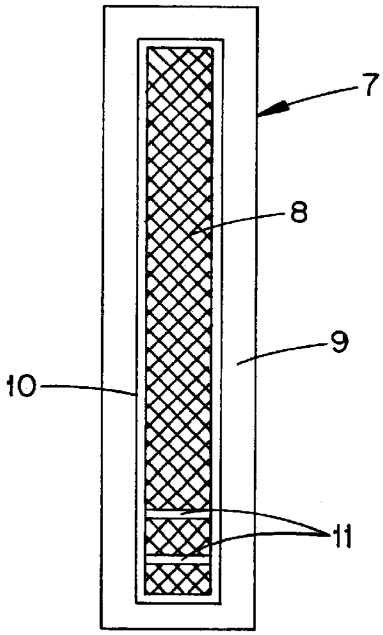
FIG. 2 is a plan view showing a netting element.

FIG. 2 shows a plate-shaped netting element 7 which is injection moulded of ethylene plastic and which has a rectangular netting portion 8 surrounded by a rectangular frame 9. The netting portion 8 is also surrounded by a collar 10 protruding from one side of the netting element 7. The collar 10 has an outer circumferential shape corresponding to the opening 6 and protrudes a distance from the netting element 7 to extend into the opening 6. In its lower portion, the netting element 7 has two horizontal strips 11 (see also FIG. 4) which are substantially hook-shaped in cross-section and which are elastically yieldable in the vertical direction so as to provide a snap connection as described in more detail below.

Figure 4:
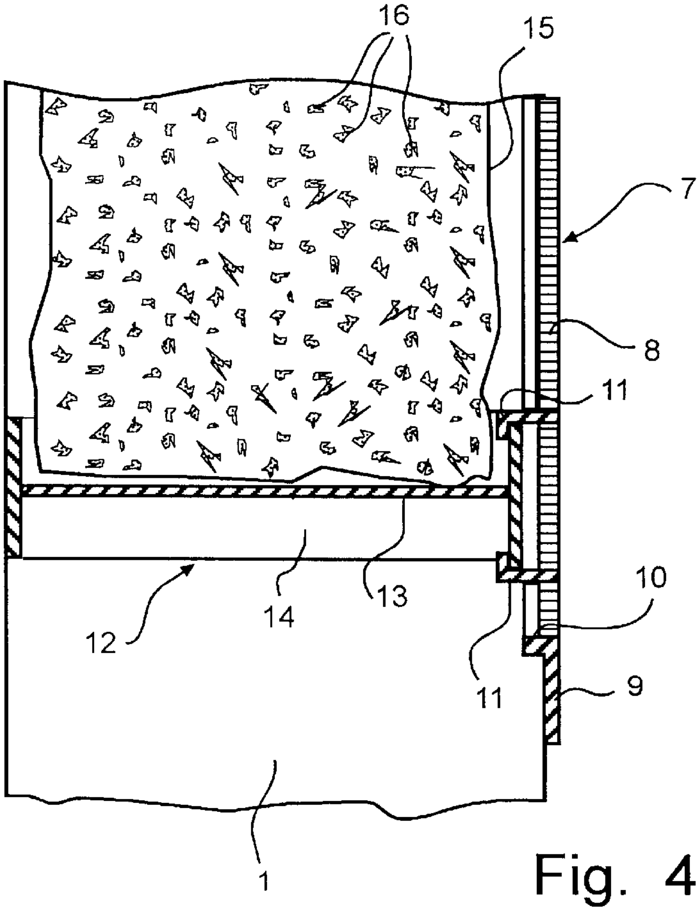
FIG. 4 is a vertical section on a larger scale along the line IV—IV in FIG. 3.

A grating element 12, which is injection moulded of ethylene plastic and shown in cross-section in FIG. 4, has a grating plate 13 surrounded by a frame 14. The grating element 12 is arranged in the tube 1 in order to divide this into an upper chamber and a lower chamber, which are interconnected by means of the grating plate 13.

When manufacturing the device 2, a circumferential glue line is applied to the frame 9 of the netting element 7, after which the netting element 7 is placed over the opening 6, so that the collar 10 formed around the netting portion 8 is introduced into the opening 6. The netting element 7 is pressed against the outside of the tube 1 to be glued to the same. Subsequently, the grating element 12 is introduced into the tube 1 via its open upper end, after which the two strips 11 of the netting element 7 are moved into snapping engagement with a portion of the grating element frame 14 (see FIG. 4). The netting element 7 then holds the grating element 12 in place in the tube 1.

A filtering tube 15 which is made of an air- as well as liquid-permeable filtering material, such as polyester, and which contains a moisture-absorbing agent 16, for instance, in the form of flakes of calcium chloride, is introduced into the upper chamber of the tube 1. The filtering tube 15 is closed at its lower end, which in the illustrated embodiment (see FIG. 4) rests on the grating plate 13 of the grating element 12. The upper portion of the plastic tube 1 is folded together with the upper portion of the filtering tube 15 along a horizontal line 17 to be closed. The upper portion of the plastic tube 1 and the filtering tube 15 is fixed in the folded position by stapling or heat-welding. A hole (not shown), which is intended for the hook 15, is punched in the folded upper portion of the device 2.

When the filtering tube 15, which is closed at its lower end, is connected in this manner in its upper portion with the plastic tube 1 and suspended together with the same by means of the hook 5, the grating element 12 can be omitted, as the filtering material itself at the lower end of the filtering tube 15 can form a liquid-permeable means between the upper and the lower chamber of the plastic tube 1.

Finally, a protective film (not shown) is applied across the opening 6 to cover this. The protective film is, of course, removed when the device is to be used.

When the device is in operation, air enters the upper chamber through the netting portion 8 and the opening 6, and moisture contained in the air is absorbed by the moisture-absorbing agent 16 in the filtering tube 15. The resulting liquid flows through the closed lower end of the filtering tube 15 and the grating plate 13 down into the lower chamber, where it is collected.

Figure 3:
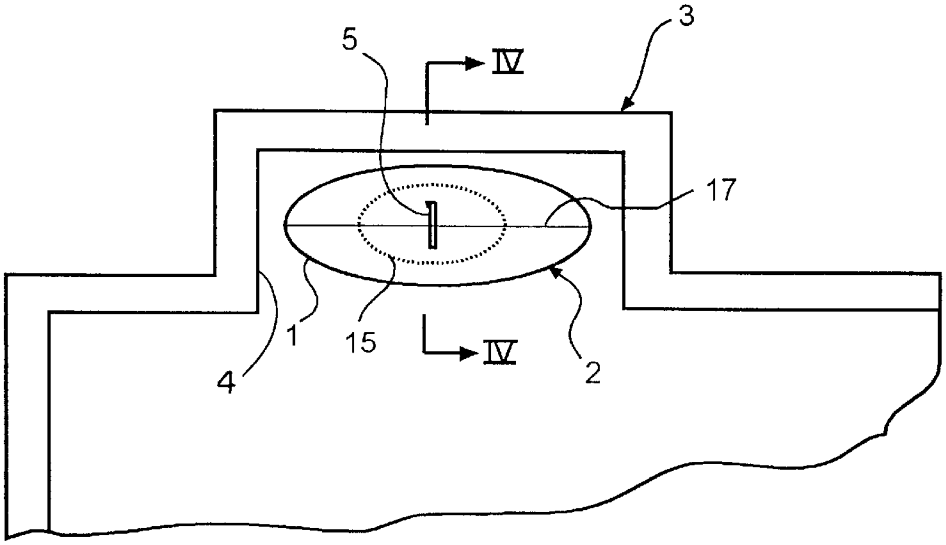
FIG. 3 shows a corner portion of a container, in which a device according to the invention is placed.

The moisture-absorbing capacity of the device 2 is considerably improved by the filtering tube 15, as shown in FIG. 3, having a smaller cross-sectional area than the plastic tube 1 has in its upper portion, which makes the filtering tube 15 accessible to air along its entire circumference and not only along the part of the circumference which is situated in front of the opening 6.

The device 2 according to the invention has its full length (e.g. about 1 m) in its operating position, e.g. when suspended in a container, while in its storage and transport position it has only about half this length as the lower part and the upper part of the plastic tube 1 as well as the upper part of the filtering tube 15 can be folded over the netting element 7.

What is claimed is:

1. A moisture-absorbing device comprising a tube, which in its longitudinal direction is divided into an upper chamber containing a moisture-absorbing agent and a lower chamber containing a liquid-collecting means and communicating with the upper chamber via a liquid-permeable means, the tube having at least one opening on a level with the upper chamber, wherein the tube is defined by a plastic tube which is closed at its lower end and made of flexible plastic sheet, an upper portion of the plastic tube forming the upper chamber and a lower portion of the plastic tube forming the lower chamber as well as the liquid-collecting means, wherein the moisture-absorbing agent is included in a filtering tube, which is made of an air and liquid-permeable filtering material and which is arranged in the upper chamber substantially in front of said opening, wherein said device is adapted for use in a container having vertical grooves formed on inside surfaces of the container for receiving said device.

2. A device according to claim 1, wherein the filtering tube is closed at its lower end, the filtering material at the lower end forming the liquid-permeable means.

3. A device according to claim 1, wherein the filtering tube has a smaller cross-sectional area than the plastic tube has in its upper portion.

4. A device according to claim 2, wherein the filtering tube has a smaller cross-sectional area than the plastic tube has in its upper portion.

* * * * *